United States Patent

[11] 3,602,521

| [72] | Inventors | Herbert R. Uhtenwoldt<br>Worcester;<br>Frederick A. Hohler, Holden; Fred<br>Thomas, Worcester, all of, Mass. |
|---|---|---|
| [21] | Appl. No. | 818,593 |
| [22] | Filed | Apr. 23, 1969 |
| [45] | Patented | Aug. 31, 1971 |
| [73] | Assignee | The Heald Machine Company<br>Worcester, Mass. |

[54] CHUCK
1 Claim, 4 Drawing Figs.

[52] U.S. Cl. ................................... 279/1 Q,
51/227, 279/4
[51] Int. Cl. ..................................... B23b 31/10
[50] Field of Search............................ 279/4, 1 Q,
2, 74, 75; 51/227; 83/180

[56] References Cited
UNITED STATES PATENTS

| 2,469,198 | 5/1949 | La Pointe .................. | 279/4 |
| 2,698,551 | 1/1955 | Olsen ......................... | 82/44 UX |
| 3,272,447 | 9/1966 | Ewing et al. ................ | 242/46.5 UX |

*Primary Examiner*—Andrew R. Juhasz
*Assistant Examiner*—James F. Coan
*Attorney*—Norman S. Blodgett ABSTRACT: This invention has to do with a chuck and, more particularly, to apparatus for holding long, thin-walled workpieces for internal grinding operations.

PATENTED AUG 31 1971 3,602,521

INVENTORS
HERBERT R. UHTENWOLDT
FREDERICK A. HOHLER
BY FRED THOMAS

*Morgan S. Blodgett*
ATTORNEY

CHUCK

BACKGROUND OF THE INVENTION

In the internal grinding of workpieces, a particular problem is encountered where the workpiece is long and is thin-walled. When ordinary work-holding equipment is used with such workpieces, there is a tendency to deform the workpiece so that, even though the grinding operation is performed accurately, the release of the workpiece from the chuck causes it to return to its original condition, thus deforming the ground surface. Nevertheless, it is necessary that the workpiece be held very securely, so that the usual means of maintaining accuracy in grinding shape, size, and quality may be used. These and other difficulties experienced with the prior art devices have been obviated in a novel manner by the present invention.

It is, therefore, an outstanding object of the invention to provide a chuck for use in holding workpieces, wherein the workpiece is held securely without deformation thereof.

Another object of this invention is the provision of a chuck for distributing clamping forces over as much of the surface of the workpiece as possible to prevent localized deformation.

A further object of the present invention is the provision of a chuck for holding workpieces having parts of differing spring constant in such a way that larger clamping forces may be sued with the portion of the workpiece having the greater spring constant and vice versa.

Another object of the invention is the provision of a chuck for use in internal grinding providing a viscoelastic damping quality which avoids breakdown of the abrasive wheel at the time of initial contact with the workpiece and which tends to reduce grinding chatter.

A still further object of the invention is the provision of a chuck having an internal workpiece-holding element that can be opened to a larger size than in the case of the prior art steel chucks, whereby it can be used with a series of workpieces having a wider range of O.D. tolerance in a particular size range and yet have an effective clamping action on all workpieces.

With these and other objects in view, as will be apparent to those skilled in the art, the invention resides in the combination of parts set forth in the specification and covered by the claims appended hereto.

SUMMARY OF THE INVENTION

In general, the invention consists of a chuck having a housing, a sleeve of elastomer material with a recess to receive a workpiece, and a pusher to bring force to bear on the sleeve to cause it to expand in a direction perpendicular to the direction of the force and to clamp the workpiece.

More specifically, the sleeve is tubular and receives the workpiece in its inner bore. The housing is provided with a bore to closely embrace the outer surface of the sleeve and is provided with an inwardly directed flange to engage one end of the sleeve; the pusher is slidable in the housing bore and engages the other end of the sleeve.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
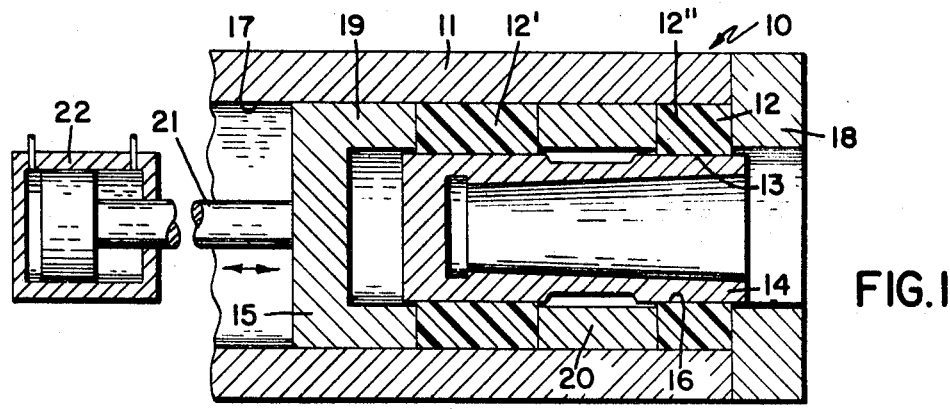
FIG. 1 is a vertical sectional view of a chuck embodying the principles of the present invention.

Referring first to FIG. 1, it can be seen that the chuck, indicated generally by the reference numeral 10, is provided with a housing 11 within which is held a sleeve 12 formed of an elastomer material such as butadiene. This sleeve is provided with a recess 13 formed to receive a workpiece 14. In the illustration, the workpiece is shown as being a valve lifter for an internal combustion engine and is, therefore, considerably elongated and thin-walled.

A pusher 15 is mounted in the housing and operates to bring pressure to bear on the sleeve 12, causing it to expand in a direction perpendicular to the direction of the pressure to clamp the workpiece 14. The sleeve 12 is tubular and is provided with an inner bore 16 which fits closely around the workpiece. The housing 11 is provided with a bore 17 which closely embraces the outer cylindrical surface of the sleeve 12. The housing is also provided with an inwardly directed flange 18 which contacts one radial end surface of the sleeve 12. The pusher 15 is in the form of a piston slidable in the bore 17 of the housing and having an axially directed flange 19 which engages the other radial end of the sleeve 12. A rod 21 extends from the pusher 15 to a fluid-operated linear actuator 22. This actuator is provided in the usual way with suitable controls alternately to introduce pressure fluid to one side of its piston and release it from the other in accordance with instructions from a control apparatus of the machine tool with which the chuck is used. In the preferred embodiment, the elastomer sleeve 12 is formed in three parts as two elastomer tubes 12' and 12'' separated by a metal tube 20. The lengths of the tubes are selected so that each elastomer tube is shorter in in length than and less than coextensive with the cylindrical portion of the workpiece surface with which it is operative. This prevents flowing of the elastomer material around corners and into grooves during clamping.

The operation of the apparatus will now be readily understood in view of the above discussion. During the operation of the machine tool, the workpiece 14 is inserted in the sleeve 12. The sleeve is in a relaxed condition because the actuator 22 is at the left-hand side of its cylinder. When fluid is introduced to the left-hand side of the cylinder, the rod 21 moves to the right and carries the pusher with it. The flange 19 engages the end of the sleeve 12, so that the sleeve is enclosed in the surfaces presented to it by the pusher flange 19, by the housing flange 18, and by the surface of the bore 17. Pressure on the end, therefore, causes it to expand radially inwardly and to clamp around the workpiece 14. Because of its elastomer nature, the sleeve adapts itself well to any irregular outer surfaces of the workpiece 14 and distributes the clamping load evenly throughout the whole entire workpiece outer surface. There is, therefore, no localized force on the workpiece and, so, no localized deformation which could result in a poorly finished workpiece. In the illustration, the surface being finished is a tapered inner bore on the inside of the thin-walled valve lifter. The application of the clamping pressure evenly throughout the length and around the outer surface of this workpiece will not cause deformation or the formation of an inaccurately finished inner bore.

Figure 2:
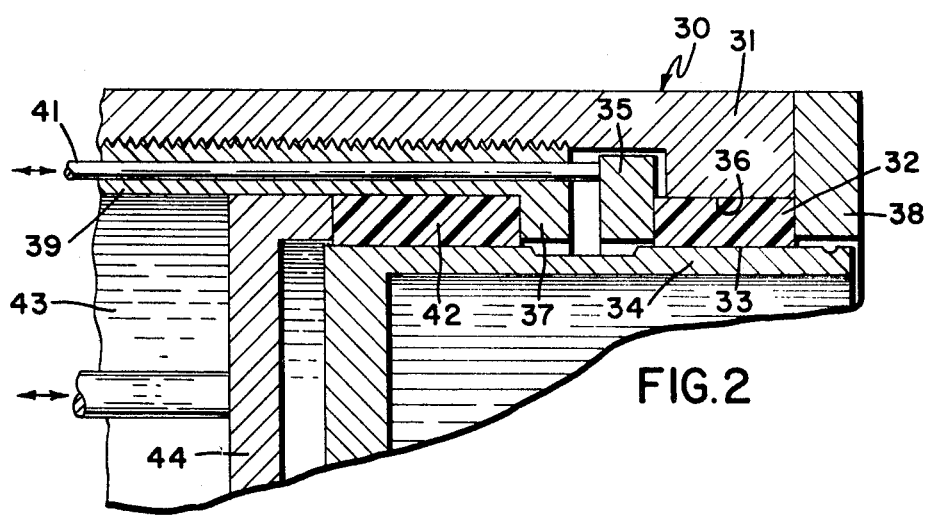
FIG. 2 is a sectional view with portions broken away of a modification of the chuck.

FIG. 2 shows a modification of the invention in which a chuck 30 is shown as having a housing 31 holding a sleeve 32. This sleeve is provided with a recess 33 in which resides a workpiece 34. An inwardly directed flange 38 engages one end of the sleeve 32, while the sleeve resides in a bore 36 in the housing. A pusher 35 engages the outer end of the sleeve 32 and is operated by an actuator working through a rod 41. A separate portion 39 of the housing is threaded into an outer portion and is provided with an inwardly directed flange 37 against which is pressed one end of a second elastomer sleeve 42. The portion 39 of the housing is provided with a bore 43 in which the sleeve 42 resides; a pusher 44 operated by an actuator presses against the other end of the sleeve 42.

The operation of this modified form of the invention is similar to that of the chuck shown in FIG. 1 but differs in that the two sleeves 32 and 42 are capable of being expanded by different amounts and, therefore, producing different clamping forces on the different parts of the workpiece. If a workpiece is similar to the valve lifter shown in the illustration, the outer end is more capable of deformation than the inner end. Furthermore, these two ends are separated by a circumferential groove so that they tend to deform differently under force. In a situation like this, it is helpful to use the principles of the present invention in producing different clamping forces on the two parts of the workpiece, so that the net deformation on the interior is nil. It is, therefore, possible to produce a good grinding surface.

Figure 3:
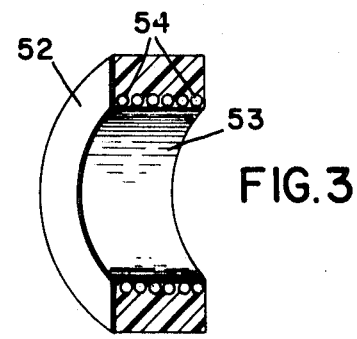
FIG. 3 is a perspective view of a modified form of an elastomer sleeve.
Figure 4:
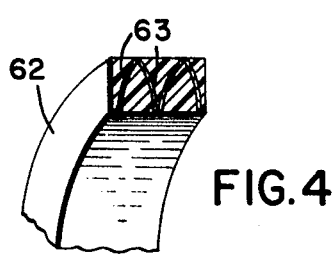
FIG. 4 is a perspective view of another form of the sleeve.

FIG. 3 shows an elastomer sleeve 52 whose inner bore 53 is protected from wear by embedding small carbide balls 54 in the material. FIG. 4 shows a similar elastomer sleeve 62 which has been reinforced by the provision of belleville springs 63 which are embedded in the elastomer material.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A chuck, comprising
   a. a housing,
   b. a tubular sleeve of elastomer material held in the housing and receiving a workpiece in its inner bore, the housing being provided with a bore to closely embrace the outer surface of the sleeve and with an inwardly directed flange to engage one end of the sleeve,
   c. a pusher in the housing operated by a fluid linear actuator to bring force to bear on the sleeve to cause it to expand in a direction perpendicular to the direction of the force to clamp the workpiece, the pusher being slidable in the said housing bore and engaging the other end of the sleeve,
   d. a second sleeve received in the housing to clamp the workpiece at a portion of its surface spaced from the portion contacted by the first-mentioned sleeve, the housing being provided with a second flange to engage one end of the sleeve, and
   e. a second pusher is provided to engage the other end of the sleeve.